United States Patent [19]

Lloyd et al.

[11] Patent Number: 4,885,202
[45] Date of Patent: Dec. 5, 1989

[54] TISSUE LAMINATE

[75] Inventors: William D. Lloyd, Neenah, Wis.; David A. Nuttal, Roswell, Ga.

[73] Assignee: Kimberly-Clark Corporation, Neenah, Wis.

[21] Appl. No.: 124,739

[22] Filed: Nov. 24, 1987

[51] Int. Cl.⁴ .............................................. B32B 5/14
[52] U.S. Cl. ................................. 428/171; 428/156; 428/172; 428/195; 428/224; 428/340; 428/511; 428/537.5; 428/903; 428/913
[58] Field of Search ............... 428/156, 171, 172, 903, 428/913, 511, 535, 537, 340, 284, 195, 198, 246

[56] References Cited

U.S. PATENT DOCUMENTS

| | | | |
|---|---|---|---|
| 3,837,995 | 4/1972 | Floden | 161/150 |
| 4,513,051 | 4/1985 | Lavash | 428/298 |
| 4,522,863 | 6/1985 | Keck et al. | 428/903 |

Primary Examiner—James J. Bell
Attorney, Agent, or Firm—Gregory E. Croft

[57] ABSTRACT

High-strength tissue products are made with two outer tissue plies thermally bonded to a center layer of meltblown fibers.

3 Claims, 1 Drawing Sheet

TISSUE LAMINATE

BACKGROUND OF THE INVENTION

In the manufacture of paper towels, an important characteristic of the final product is its wet strength. Paper towels are often used to wipe up fairly large liquid spills and it is necessary that they hold together as well as absorb the liquid. Most commonly, the wet strength of the paper towel is enhanced by the addition of chemical wet strength additives. Alternatively, paper towels have been made using a scrim reinforcement between two tissue plies, resulting in a very strong, but relatively expensive, paper towel.

SUMMARY OF THE INVENTION

It has now been discovered that a high strength paper towel product can be made by sandwiching a meltblown fiber layer between two tissue plies. The meltblown fibers are thermally bonded to each of the two outer tissue plies as well as to each other, thereby providing a unitary composite towel structure which is substantially stronger than a comparable two-ply towel while retaining other desirable characteristics such as absorbency and softness Hence, in one aspect, the invention resides in a tissue product comprising two outer tissue plies thermally bonded to a center layer of meltblown fibers.

In a further aspect, the invention resides in a method for making a composite tissue product comprising: (a) feeding two tissue plies into a nip formed between two vacuum suction rolls; (b) meltblowing thermoplastic fibers into said nip between the two tissue plies such that the meltblown fibers are deposited onto the surface of the tissue plies; and (c) pressing the two plies together to form a composite tissue product.

Each tissue ply can be any cellulosic web, airformed or wet-pressed, having a basis weight of from about 10 to about 40 grams per square meter per ply. The two plies can be the same or different depending on the desired characteristics of the tissue product. For example, a very light weight sheet can be combined with a soft, bulky sheet. Or a wet-pressed creped sheet can be combined with an uncreped airlaid or throughdried sheet. Preferably both tissue plies are creped webs containing primarily papermaking fibers, although other fibers can be present. The presence of thermoplastic fibers blended with the cellulose fibers of the tissue plies can improve the bonding between the tissue plies and the meltblown fibers. As an example, coformed webs made by meltblowing thermoplastic fibers in combination with cellulosic fibers are also suitable. Such webs are described in U.S. Pat. No. 4,623,576 to Lloyd et al., which is herein incorporated by reference. The tissue plies need not be air dry. One or both of the tissue plies can be 65% or greater bone dry.

Meltblowing is a well known commercial process for producing nonwoven fibrous webs. In general it comprises extruding a thermoplastic through a die tip in the presence of a stream of air which breaks up the extrudate into individual fibers. In the case of nonwoven web manufacture, the fibers are then collected on a moving belt and solidified to form a nonwoven fibrous structure. The method of meltblowing is also described in U.S. Pat. No. 3,978,185 to Buntin et al. dated Aug. 31, 1976, which is herein incorporated by reference. The meltblown layer of the product of this invention can have a basis weight of from about 5 to about 30 grams per square meter.

DETAILED DESCRIPTION OF THE DRAWING

Figure 1:
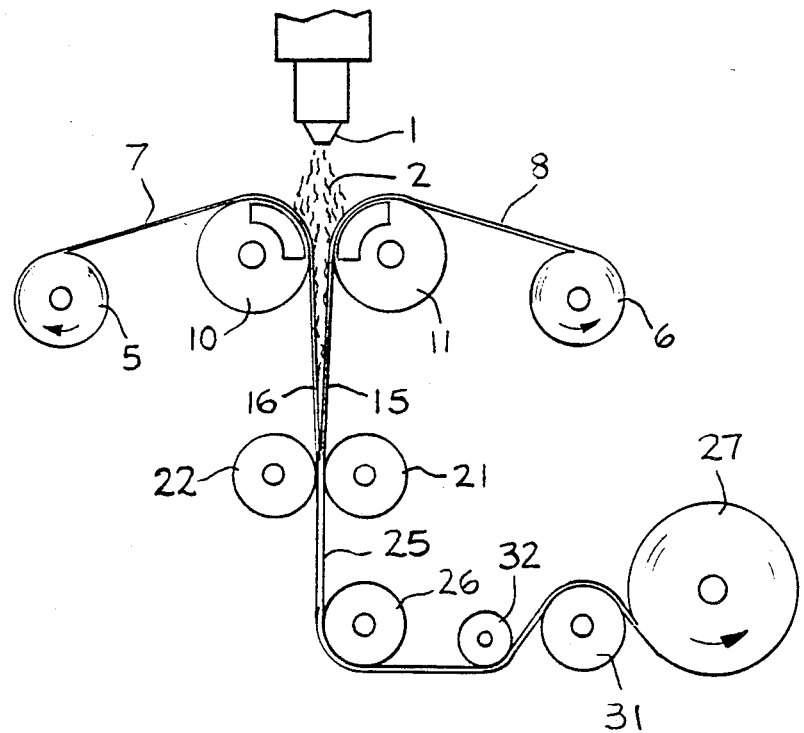
FIG. 1 is a schematic flow diagram of the method of this invention.

Directing attention to the drawing, the invention will be described in greater detail. FIG. 1 illustrates the method of this invention useful for making wipes and paper towels. Shown is the meltblowing die head 1 to which molten thermoplastic is fed by an extruder. The die head contains a large number of small orifices through which the thermoplastic is extruded and produces a continuous stream of high temperature gasborne discrete fibers 2. The height of the die head can be adjusted to create the desired degree of tackiness in the meltblown fibers.

Rolls 5 and 6 of tissue are continuously unwound to feed two tissue plies 7 and 8 to an open nip formed between two vacuum suction rolls 10 and 11, at which point the meltblown fibers are drawn or deposited onto the surface of each of the two tissue plies. The suction rolls can have a high open area (about 80%) and can be of a honeycomb structural design commonly used in the tissue making industry. Because the meltblown fibers are in a softened state at this point, they intimately bond to the fibers of the tissue plies. If necessary, an adhesive spray can also be directed into the open nip to promote adhesion. Alternatively or in addition, steam can also be sprayed into the nip to enhance the downstream embossing step. Thereafter the meltblown fiber-combining tissue plies 15 and 16 are consolidated to form a unitary sheet. This is preferably accomplished while the meltblown fibers are still fusible to each other. However, if the meltblown fibers have completely solidified, they can be resoftened with additional heat. The combination of the two plies is advantageously carried out by passing the two plies through a nip formed by two rolls 21 and 22, which are either calender rolls or embossing rolls and can be heated as necessary. Preferably, the two plies are pressed together between two embossing rolls which bond the two plies together at select points rather than overall as is the case with calender rolls. The embossing rolls can also be covered with one or two fabrics to impart a more gentle embossing pattern to the final product. The fabrics wrapping the embossing rolls can be the same or different.

Although not shown in the Drawing, one or both of the tissue plies can be supported by a carrier fabric as the meltblown fibers are deposited thereon. This is particularly useful if the tissue ply is very light or weak. The carrier fabric can also serve as an embossing fabric in the subsequent nip between rolls 21 and 22.

After embossing or consolidation, the composite tissue product 25 is passed over a turning roll 26 and wound onto a reel 27 for subsequent converting operations into a specific product form. Roll 31 is a drive roll for the reel winder and roll 32 is used for web tension control.

Figure 2:
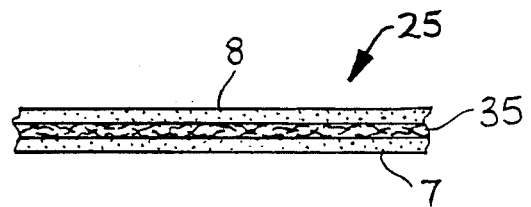
FIG. 2 is a cross-sectional representation of the product of this invention.

FIG. 2 is a cross-sectional representation of the composite tissue product produced by the method of FIG. 1. Shown are the two tissue plies 7 and 8 and the center meltblown layer 35 which bonds the entire product together into a unitary composite structure. In a preferred embodiment, the tissue plies are creped tissue webs consisting essentially of cellulosic papermaking fibers and have a basis weight of about 15 to 25 grams per square meter per ply. The meltblown layer consists of polypropylene meltblown fibers and has a basis weight of about 10 to 15 grams per square meter.

EXAMPLES

In order to illustrate the improved wet strength exhibited by tissue products made in accordance with this invention, two samples were prepared which closely simulate the structure and properties of the tissue products of this invention. Specifically, a two-ply tissue product was made by meltblowing a layer of polypropylene fibers onto a single ply of creped tissue consisting of cellulosic papermaking fibers.

The particular creped tissue used was Softique® facial tissue manufactured commercially by Kimberly-Clark Corporation, which had a total basis weight of about 18.5 pounds per 2880 square feet (31 grams per square meter). To simulate the product of this invention, the two plies of the Softique® facial tissue were separated and the meltblown layer was deposited directly onto one of the plies and thermally bonded thereto in a manner well known in the nonwovens industry and as generally described in the previously mentioned Buntin et al. patent. After the meltblowing operation, the other ply was replaced over the meltblown layer, thereby forming a two-ply tissue. The properties of two different test samples in accordance with this invention and the control (Softique® two-ply) are set forth in the table below.

TABLE

| Sample | Basis Weight | Dry Tensile (M.D.) | Dry Tensile (C.D.) | Wet Tensile (C.D.) |
| --- | --- | --- | --- | --- |
| Control | 18.5 | 1100 | 400 | 100 |
| Test #1 (3.5 pounds meltblown per 2880 square feet) | 21.5 | 1398 | 585 | 232 |
| Test #2 (7.1 pounds meltblown per 2880 square feet) | 25.1 | 1890 | 837 | 500 |

The results clearly illustrate the increase in wet strength attributable to the presence of a meltblown layer in the center of the tissue.

We claim:

1. A composite tissue product comprising two outer tissue plies, each of which is intimately overall thermally bonded to a layer of meltblown fibers, said composite tissue product being additionally thermally bonded together at select points.

2. The product of claim 1 wherein the basis weight of the meltblown layer is from about 10 to about 15 grams per square meter.

3. The product of claim 2 wherein the basis weight of each outer tissue ply is from about 15 to about 25 grams per square meter.

* * * * *